June 2, 1931.  S. J. SANFORD  1,807,877
MOTION PICTURE
Filed May 12, 1926
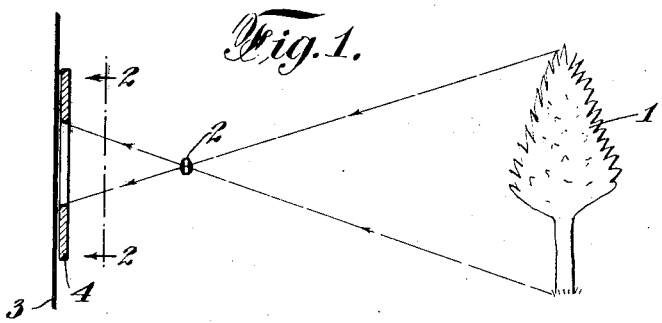
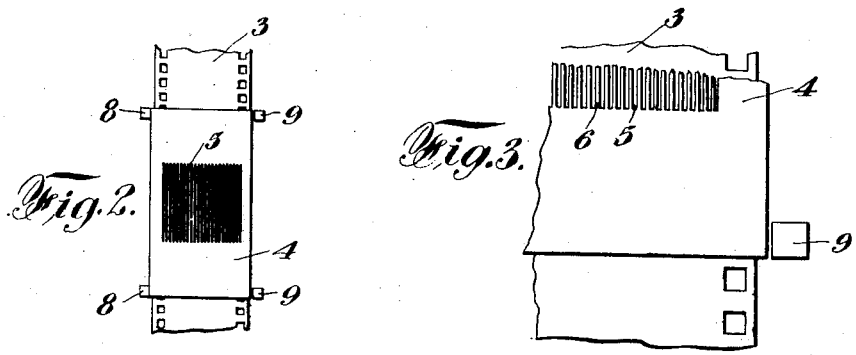
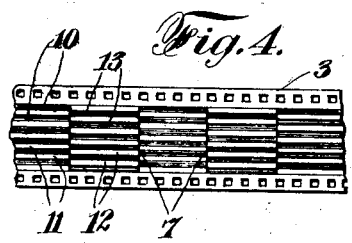
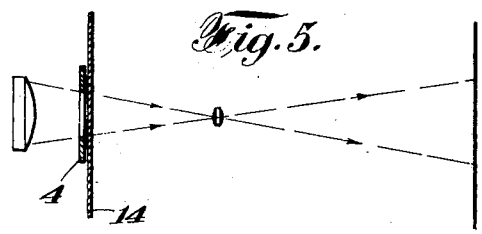
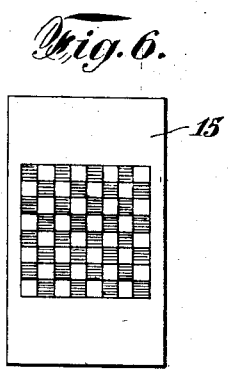
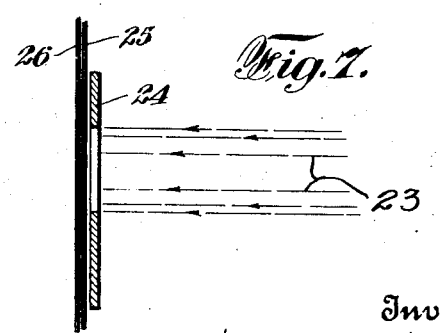
Inventor
Sydney J. Sanford
By his Attorneys Patented June 2, 1931

1,807,877

UNITED STATES PATENT OFFICE

SYDNEY J. SANFORD, OF PHILADELPHIA, PENNSYLVANIA, ASSIGNOR OF ONE-HALF TO CHESTER W. LARNER, OF PHILADELPHIA, PENNSYLVANIA

MOTION PICTURE

Application filed May 12, 1926. Serial No. 108,481.

This invention relates to photography and particularly to motion picture films and to a method for photographing pictures on a negative film and projecting the pictures from a positive film.

Heretofore in motion picture films successive pictures are taken on a strip of film, each picture occupying the whole of a given length of film. The total length of film is therefore the number of pictures multiplied by the length of each picture.

It is an object of my invention to reduce the length of the film without reducing the size of the pictures but still permit the same number of pictures or exposures to be taken that would be had in the prior films.

More specifically, an object of the invention is to photograph a plurality of pictures on the film space ordinarily occupied by a single picture, thereby permitting the given number of exposures to be made on a film having a length which is a fraction of that of the prior films.

Other objects and advantages will appear from the following description of the accompanying drawings, in which:

Fig. 1 is a diagrammatic view of elements for making an exposure on a negative film;

Fig. 2 is a front elevation of the screen and film taken on line 2—2 of Fig. 1;

Fig. 3 is an enlarged fragmentary view of the screen;

Fig. 4 is a plan view of the film;

Fig. 5 is a diagrammatic view showing the arrangement of parts for projecting the picture;

Fig. 6 is a modified form of screen having opaque portions, and

Fig. 7 shows how a positive film of short length can be made from a negative film of usual length.

In the illustrative embodiment of my invention I have shown diagrammatically in Fig. 1 an object 1 to be photographed, the light rays from which pass through lenses 2, and any other photographic mechanism that is usual, on to a film 3. In order to take a plurality of pictures on the film space ordinarily occupied by a single picture there is disposed in front of the film an opaque screen 4 having a series of parallel slots or transparent portions 5, horizontally or vertically disposed and so spaced as to form a series of opaque bars 6. The screen 4 will during exposure be held closely to the film 3 so that the light rays will only impress an image upon a fractional area of the film. The width of the bars and slots is determined by the number of pictures to be taken in a given picture space. For example, if only two pictures are to be taken the width of the slots and bars 5 and 6 will be equal. In this case, to take the second picture the screen 4 will be moved laterally, while the film remains stationary, thereby covering the first exposure and uncovering the unexposed part. During this movement the usual camera shutter mechanism will have been interposed between the object and the film, but after the screen is placed in its new position the shutter mechanism will open and make the second exposure on the film. Thereafter the camera shutter mechanism will again be closed and the film moved as is usual a distance equal to the length of a picture, which is bounded, as shown in Fig. 4, by transverse lines 7. To limit the screen movement, there are preferably provided stops 8 and 9, which if desired could be made adjustable in order to permit the use of various screens.

If it is desired to make say three exposures on the given film area the slots 5 would be half the width of the opaque bars 6, and the screen after each exposure would be moved the width of the slots 5, thereby uncovering an unexposed portion of the film during three successive exposures, while at the same time keeping the previously exposed portions covered.

In Fig. 4 the first exposure is indicated by the alternate spaces 10, the next exposure by spaces 11, and the following successive exposures at 12, 13, etc.

It will thus be seen that I have provided a motion picture film wherein for a given number of exposures the length of the film will be one-half that of the prior film, if two pictures are taken, and one-third the length of the prior film if three pictures are taken.

To project the pictures from a positive film which would be made from the negative film above described, the reverse operation is employed, namely, of using the screen 4 preferably interposed between the positive film 14 and the source of projecting light. The film will be held stationary as is usual while the usual shutter mechanism permits projection of the picture on the projecting screen, and when the shutter mechanism is interposed between the projecting light and screen the opaque screen 4 will be moved to uncover the second exposure, this being followed by the usual shutter mechanism passing out of the path of light and allowing projection of the second exposure on the picture screen. This series of steps will be followed for each successive picture length of the film. Should it be desired not to have the film remain in a stationary position long enough to make the two exposures, the film could be run at its normal rate for its full length, and during each period of stop only one exposure would be projected. When the film had been run through its full length the same could again be run through the projecting mechanism, but this time projecting the second exposure, and if three or more exposures have been made for a given space the film could be run through a corresponding number of times until all exposures had been projected. This method of operation would still permit the use of a short film and would only necessitate passing the film through the projecting mechanism a plurality of times and moving the screen only between successive runs.

In the projection of the pictures upon the screen there will be a series of alternate black strips and picture strips, but due to the minute width of each the picture will have the appearance of being a solid one, the black strips not being noticeably visible to an observer. This invisibility of the black strips is partly due to the fact that by shifting the opaque screen 4 transversely for each successive picture there will be on the projection screen first a black strip and then a picture strip in the space formerly occupied by the black strip. In other words, the picture strips and black strips will alternate on the projection screen and thus the black spaces will be filled in by the previous image, due to the so-called persistence of vision. The observer first seeing a picture strip will have a light impression carried over during the presence of the black strip. Hence, this black strip should not appear as dark as it actually is, and this would give the appearance of a solid projected picture.

A possible use of my improved method is that instead of taking a plurality of pictures only a single picture will be taken, but this single picture will be taken with the use of the opaque screen. The positive film instead of having alternate strips of different pictures would present alternate strips of a picture and a clear space. The film would then have only a single picture for a given length of film as in the prior films, but when this picture was projected without the aid of an opaque screen the alternate picture strips and white strips projected on to the screen would give what might be termed a half tone effect.

Fig. 6 illustrates another type of intercepting screen 15 which could be used in the same manner as screen 4, Fig. 2. Screen 15 has square transparent and opaque portions as shown, and between exposures would be moved the width of one of these squares in either direction. This would produce pictures on the film consisting of square spots instead of parallel lines, as in the case of screen 4. This arrangement has the advantage over the parallel strips in that it would more nearly approach the usual half-tone effect, and the black spaces between the spots of picture at any moment on the projecting screen would be even less noticeable than the continuous black strips running through the picture.

In order to produce a positive film according to the method of this invention it is not necessary to photograph the picture through intercepting screens as herein described. The required positive can be produced directly from a negative taken by the ordinary method. It is only necessary to add to the customary printing machine an intercepting screen, such as 4 or 15 with the necessary mechanism for moving this screen as in the case of the camera or projector. The arrangement is shown diagrammatically in Fig. 7 where 23 is a beam of light from some source of illumination, 24 is the intercepting screen, 25 the negative film and 26 the positive film.

The first exposure is made by passing light through screen 24 and negative film 25 on to the positive film 26, producing a positive picture consisting of strips or spots corresponding to the transparent portions of screen 24. The printing light is then cut off and screen 24 is moved to its alternate position and at the same time negative film 25 is moved forward the length of one picture space. The printing light is then turned on and a second exposure upon negative film 26 produces another set of positive strips or spots alternating with those produced by the first exposure.

The printing light is then again cut off, screen 24 is moved back to its original position, film 25 is moved ahead the length of one picture space and film 26 is moved ahead the length of one picture space.

The process is the same ordinarily used in printing motion picture film, except for the addition of screen 24, and except for the fact that, although the negative film is moved forward for each exposure, the positive film is moved forward for only every other movement of the negative film.

This process produces exactly the same result as if the negative had been photographed through an intercepting screen but it is quite advantageous in the respect that a positive film of reduced length can be made at any time from an existing negative of the usual length. This makes it possible to photograph a picture in the usual way and then from the negative make either a positive of the same length or a positive of reduced length.

In general it may be stated that in accordance with my invention any arrangement of opaque shapes may be used with an oscillating or other movable screen, provided the opaque parts and the transparent parts are so shaped that they will match if superimposed upon each other.

A further modification in the method of projecting consists in using a screen identical with the screen used in making the negative or positive, except that the usual opaque portions of the screen used in the projector are semi-transparent.

The result of this would be that at no time would there be any strips or spots on the projecting screen which would be unlighted or black. These spots would have a more or less vague picture image in these spaces. This image would be that of a different exposure from the fully illuminated image on the projected screen at that time, and in the case of moving objects would not match precisely with the fully illuminated image; but on account of being only faintly illuminated and therefore relatively vague in detail, the mismatching of these images would be imperceptible.

The advantage of using a screen with semi-opaque portions lies in the fact that by replacing the black portions on the projecting screen with faint picture images, the interval between successive pictures on the screen could be increased since the appearance of a complete picture would not be dependent upon the persistence of vision to so great an extent.

I claim:

1. A motion picture film having a series of successive picture spaces, each of said picture spaces having a plurality of spaced portions and a plurality of successive independent exposures on groups of said spaced portions each group and corresponding exposure being distributed across the picture space, the portions being so small as to appear to the eye to merge together, successive groups forming a continuous series of motion pictures across each of said picture spaces and groups of said spaced portions across each successive picture spaces being of one continuous motion picture whereby a relatively short length of motion picture film is provided.

2. The method of photographing an object upon a moving picture film comprising exposing one-half of a picture space on the film, the exposed and unexposed halves alternating in portions so small that the exposed portions appear to the eye to merge together, then exposing the remaining half of said picture space while the first mentioned half is covered, said exposures taking place while the film is in the same position, moving the film longitudinally the distance of a picture space, and then repeating said steps throughout the whole series of picture spaces on said film forming a continuous motion picture of relatively short length.

3. The method of producing a motion picture film comprising providing a screen having opaque and transparent portions alternating in sections so small that the separate sections appear to the eye to merge together and so arranged that an area of the film formerly covered by one group of said portions may be superimposed by the alternate portions, then passing light onto the film through said transparent portions when the latter is in one position, then effecting relative movement between the film and the screen to superimpose the opaque portions on the exposed part of the film, then suitably exposing the film, then moving the film along its major axis to bring another picture space into an exposing position, then exposing said space in a manner similar to exposure of the preceeding space to form a continuous motion picture film of relatively short length formed of a series of pictures extending across each picture space and continuing to the succeeding picture spaces.

4. The method of producing a motion picture film comprising providing a screen having opaque and transparent bars and slots respectively of substantially equal width disposed longitudinally of the film, the width of the bars and slots being so small that the picture exposed through the slots only appears to merge together, exposing the film through the slots, shifting the screen laterally of the film to expose the alternate unexposed portions of the film, moving the film longitudinally the distance of a picture space, repeating the previous steps on the second picture space and so forth throughout successive portions of each picture space and successive picture spaces to provide a continuous motion picure film one-half the length required when each picture space is utilized for one picture only.

SYDNEY J. SANFORD.